US009005506B2

(12) United States Patent
Horizono et al.

(10) Patent No.: US 9,005,506 B2
(45) Date of Patent: Apr. 14, 2015

(54) MANUFACTURING METHOD AND MANUFACTURING APPARATUS OF FIBER REINFORCED COMPOSITE MATERIAL

(75) Inventors: Hideki Horizono, Aichi (JP); Shigeru Nishiyama, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 703 days.

(21) Appl. No.: 13/129,886

(22) PCT Filed: Nov. 18, 2009

(86) PCT No.: PCT/JP2009/069586
§ 371 (c)(1),
(2), (4) Date: May 27, 2011

(87) PCT Pub. No.: WO2010/058803
PCT Pub. Date: May 27, 2010

(65) Prior Publication Data
US 2011/0241250 A1 Oct. 6, 2011

(30) Foreign Application Priority Data

Nov. 19, 2008 (JP) ................................. 2008-296127

(51) Int. Cl.
*B29C 70/46* (2006.01)
*B29C 43/36* (2006.01)
(Continued)

(52) U.S. Cl.
CPC .............. *B29C 70/467* (2013.01); *B29C 43/36* (2013.01); *B29C 70/541* (2013.01); *B29C 2043/3444* (2013.01); *B29K 2105/0002* (2013.01); *B29K 2105/0872* (2013.01)

(58) Field of Classification Search
USPC ................................. 264/279, 279.1, 642, 643
See application file for complete search history.

(56) References Cited

U.S. PATENT DOCUMENTS 4,692,291 A * 9/1987 Angell, Jr. .................... 264/109
4,961,700 A 10/1990 Dunbar
(Continued)

FOREIGN PATENT DOCUMENTS

DE 102 58 630 7/2004
EP 0 423 676 4/1991
(Continued)

OTHER PUBLICATIONS

Supplementary European Search Report dated Jun. 12, 2013 issued in corresponding European Patent Application No. 09827584.5.
(Continued)

*Primary Examiner* — Jeremiah Smith
(74) *Attorney, Agent, or Firm* — Wenderoth, Lind & Ponack, L.L.P.

(57) ABSTRACT

A manufacturing method and a manufacturing apparatus of a fiber reinforced composite material are provided, in which the whole fiber-based material is impregnated with a resin and a molding can be performed with high dimensional accuracy. A manufacturing method of a fiber reinforced composite material according to the present invention includes fixing a fiber-based material having a first surface to a first mold to provide an opening for the first surface; setting a second mold having a second surface such that the first surface faces the second surface through a space; filling resin into the space; and relatively moving the second mold and the first mold to bring the second surface closer to the first surface, such that the fiber-based material is impregnated with the resin.

18 Claims, 9 Drawing Sheets

(51) Int. Cl.
  *B29C 70/54* (2006.01)
  *B29C 43/34* (2006.01)
  *B29K 105/00* (2006.01)
  *B29K 105/08* (2006.01)

(56) References Cited

U.S. PATENT DOCUMENTS

| | | | |
|---|---|---|---|
| 5,424,017 A | 6/1995 | Hinduja et al. | |
| 5,433,915 A * | 7/1995 | Yamamoto et al. | 264/510 |
| 5,464,337 A * | 11/1995 | Bernardon et al. | 425/112 |
| 6,558,590 B1 | 5/2003 | Stewart | |
| 2003/0227107 A1* | 12/2003 | Stewart | 264/236 |
| 2007/0176317 A1* | 8/2007 | Morita et al. | 264/138 |

FOREIGN PATENT DOCUMENTS

| | | |
|---|---|---|
| GB | 1 367 924 | 9/1974 |
| JP | 51-22030 | 7/1976 |
| JP | 56-135025 | 10/1981 |
| JP | 6-155483 | 6/1994 |
| JP | 2002-36257 | 2/2002 |
| JP | 2002-538991 | 11/2002 |
| JP | 2004-130598 | 4/2004 |
| JP | 2005-271551 | 10/2005 |
| JP | 2007-1179 | 1/2007 |
| WO | 94/23924 | 10/1994 |

OTHER PUBLICATIONS

Canadian Notice of Allowance issued Feb. 4, 2013 in corresponding Canadian Patent Application No. 2,744,180.
International Search Report issued Mar. 2, 2010 in International (PCT) Application No. PCT/JP2009/069586.
JP Decision to Grant a Patent issued May 8, 2014 in corresponding JP Application No. 2008-296127 (with English translation).

* cited by examiner

MANUFACTURING METHOD AND MANUFACTURING APPARATUS OF FIBER REINFORCED COMPOSITE MATERIAL

CROSS-REFERENCE TO RELATED APPLICATIONS

The present application is the U.S. National Stage entry of International Application No. PCT/JP2009/069586, filed on Nov. 18, 2009; which application claims priority benefit of Japanese Application No. 2008-296127, filed Nov. 19, 2008.

TECHNICAL FIELD

The present invention relates to a manufacturing method of a fiber reinforced composite material and a manufacturing apparatus of a fiber reinforced composite material.

BACKGROUND ART

A fiber reinforced composite material is known as a kind of composite material of fiber-based material and resin. The fiber reinforced composite material has high strength as well as light weight, and is used as a material for apparatuses such as an automobile and an aircraft.

Figure 1:
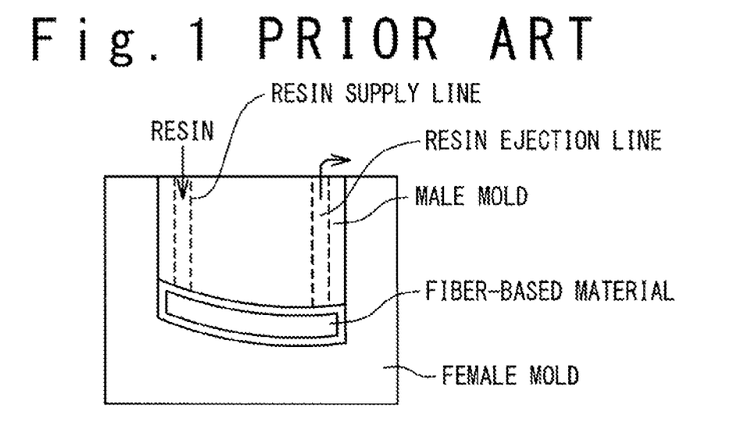
FIG. 1 is a diagram showing a manufacturing method of a fiber reinforced composite material by an RTM method.

A RTM (Resin Transfer Molding) method is known as a manufacturing method of the fiber reinforced composite material. FIG. 1 is a diagram schematically showing a molding method using the RTM method. In the RTM method, a molding die (a pair of female and male molds in FIG. 1) is prepared. A fiber-based material is placed between the female mold and the male mold. The female and male molds are so arranged as to come in close contact with both surfaces of the fiber-based material. The female and male molds are provided with a resin supply line and a resin ejection line. After the female and male molds are clamped, the resin is supplied to the fiber-based material through the resin supply line. The fiber-based material is impregnated with the supplied resin. An excess portion of the resin is ejected through the resin ejection line. After the fiber-based material is impregnated with the resin, the resin is cured. Thus, the fiber reinforced composite material is manufactured.

Patent Literature 1 (JP 2004-130598A) and Patent Literature 2 (JP Showa 56-135025A) are known as techniques relating to the RTM method.

Figure 2:
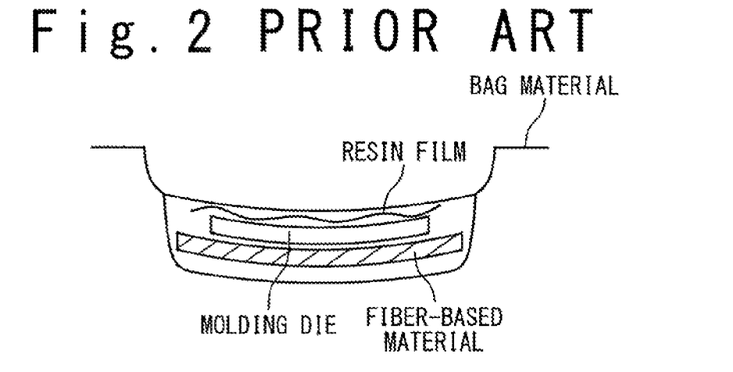
FIG. 2 is a diagram showing the manufacturing method of the fiber reinforced composite material by an RFI method.

As another manufacturing method of the fiber reinforced composite material, a RFI (Resin Film Infusion) method is known. FIG. 2 is a diagram schematically showing the RFI method. In the RFI method, the fiber-based material is placed on a molding die and a resin film is placed on one surface of the fiber-based material. The fiber-based material provided with the resin film is covered with a bag member. Then, a pressure of a space covered by the bag member is reduced and the resin film is cured by heating and pressurizing. Thus, the fiber reinforced composite material is obtained. At this time, the resin film infiltrates in a thickness direction of the fiber-based material.

CITATION LIST

Patent Literature

[Patent Literature 1]: JP 2004-130598A
[Patent Literature 2]: JP Showa 56-135025A

SUMMARY OF THE INVENTION

According to the RTM method shown in FIG. 1, the fiber reinforced composite material can be manufactured to have a dimension of a space formed between the female and male molds. Therefore, the fiber reinforced composite material can be obtained with good dimensional accuracy. Meanwhile, the fiber-based material has a flow resistance against the resin. The resin is supplied from a portion connected with the resin supply line to a portion connected with the resin ejection line so as to impregnate the fiber-based material. Due to the flow resistance of the fiber-based material, there is a case that a portion which is not fully impregnated with the resin is generated depending on a size of the fiber-based material.

Figure 3:
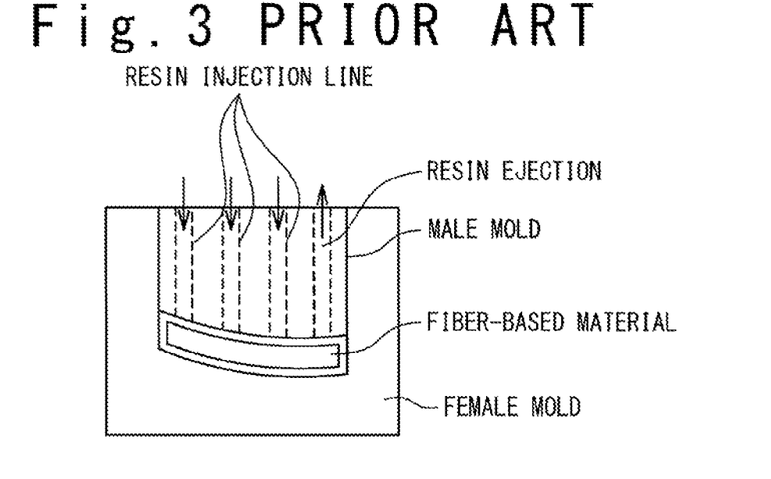
FIG. 3 is a diagram showing the manufacturing method of the fiber reinforced composite material by the RTM method.

In the RTM method, in order that the fiber-based material is entirely impregnated with the resin, it could be considered to provide a plurality of resin supply lines as shown in FIG. 3. However, in such a case, the structure of the molding die becomes complicated. At this time, there are problems such as increase of burden for cleaning the molding die after the molding is completed. Moreover, when the plurality of resin supply lines are provided, a control of a flow amount of the resin becomes complicated and a process management becomes difficult.

Meanwhile, in a case of using the RFI method, the resin can be arranged on the whole surface of the fiber-based material. However, it is difficult to obtain high dimensional accuracy with respect to the thickness.

Therefore, a subject matter of the present invention is to provide a manufacturing method and a manufacturing apparatus of a fiber reinforced composite material, in which the whole fiber-based material is impregnated with a resin and a molding can be performed with high dimensional accuracy.

A manufacturing method of a fiber reinforced composite material according to the present invention includes fixing a fiber-based material having a first surface to a first mold to provide an opening for the first surface; setting a second mold having a second surface such that the first surface faces the second surface through a space; filling resin into the space; and depressing the second mold toward the first mold to bring the second surface closer to the first surface, such that the fiber-based material is impregnated with the resin.

According to the present invention, the resin filled in the space is pushed by the second surface of the second mold and thereby infiltrates into the fiber-based material. Since the fiber-based material is face-widely impregnated with the resin, the resin is easily spread over the whole part of the fiber-based material. Moreover, a shape of the fiber reinforced composite material to be molded has a shape corresponding to the first and second molds. The thickness of the fiber reinforced composite material is coincident with a final distance between the first mold and the second mold. In other words, a molding can be performed with good dimensional accuracy.

It is preferable that the filling the resin includes reducing a pressure of the space; and supplying the resin into the space after the pressure-reducing. By reducing the pressure of the space, air bubbles can be prevented from being mixed into the fiber-based material.

It is preferable that the fixing the fiber-based material to the first mold includes setting the first mold such that the end portions of the fiber-based material are sandwiched by surfaces of the first mold. According to the present invention, the fiber-based material is fixed in the end portions by the both surfaces. Since the fiber-based material is securely fixed, the fiber-based material can be prevented from moving at the time of filling the resin. Thus, the dimensional accuracy of the fiber reinforced composite material to be molded can be improved.

It is preferable that the manufacturing method of the fiber reinforced composite material mentioned above further includes curing the impregnated resin after the impregnation with the resin.

It is preferable that the curing the resin includes curing the impregnated resin by pressurizing.

It is preferable that the curing the resin by pressurizing includes pressurizing the impregnated resin by a resin accumulator.

It is preferable that the curing the resin mentioned above includes curing the same by warming the impregnated resin.

It is assumed that the fiber-based material includes a central region and end regions on end sides of the central region and that the first surface is provided on each of the central region and the end regions. At this time, the second mold is preferably provided on a plurality of positions to oppose to the central region and the end regions, respectively. Then, it is preferable that the depressing includes depressing the second surface of the second mold corresponding to the central region to come into contact with the first surface of the central region; and depressing the second surface of the second mold corresponding to each of the end regions to come into contact with the first surface of the end region after the above step.

According to the present invention, in the impregnating the resin, the resin impregnates from the central region to the end region. Thus, the air bubbles contained in the fiber-based material can be surely removed. As a result of this, a dry spot (i.e., a portion that is not fully impregnated with the resin) can be more surely prevented from being contained in the fiber reinforced composite material to be molded.

At this time, the fiber-based material may be folded between the central region and the end regions.

A manufacturing apparatus of a fiber reinforced composite material according to the present invention includes: a first mold configured to fix a fiber-based material having a first surface to provide an opening for the first surface; a second mold having a second surface and arranged such that the first surface faces the second surface through a space; and a drive mechanism configured to relatively moving the second mold with respect to the first mold such that the second surface approaches the first surface. In this manufacturing apparatus, the second surface is brought into contact with the first surface by the drive mechanism under the condition that a resin is filled into the space, whereby the resin impregnates into the fiber-based material.

It is preferable that the manufacturing apparatus of the fiber reinforced composite material mentioned above includes a resin supply line that is connected to the space such that the resin can be filled into the space.

It is preferable that the resin supply line constructed to be able to pressurize inside the space.

It is preferable that the manufacturing apparatus of the fiber reinforced composite material mentioned above further includes a pressurizing line that is connected to the space such that the space is pressurized.

The pressurizing line is preferably connectable with a resin accumulator.

It is preferable that the manufacturing apparatus of the fiber reinforced composite material mentioned above further includes a sealing member for sealing the space.

The first mold is preferably formed to sandwich the end portions of the fiber-based material by the surfaces of the first mold.

It is preferable that the manufacturing apparatus of the fiber reinforced composite material mentioned above further includes a resin ejection line that is connected to the space to be able to eject the resin inside the space.

It is preferable that the manufacturing apparatus of the fiber reinforced composite material mentioned above further includes a stopper mechanism for restricting a movement of the second mold in order that the second surface is not further moved to a fiber-based material side than a predetermined first position. According to the present invention, a final relative position of the second mold with respect to the first mold can be accurately controlled by the stopper mechanism. Thus, the dimensional accuracy of the fiber reinforced composite material to be molded can be further improved.

It is assumed that the fiber-based material includes the central region and the end region provided in an end side than the central region and that the first surface is provided on each of the central region and the end region. At this time, the second mold is preferably provided on a plurality of positions respectively corresponding to the central region and the end region and it is preferable that the drive mechanism can independently move a plurality of second molds, respectively.

According to the present invention, it becomes possible to provide a manufacturing method and a manufacturing apparatus of a fiber reinforced composite material capable of impregnating a whole part of a resin base material with a resin and performing a molding with high dimensional accuracy.

DESCRIPTION OF EMBODIMENTS

First Embodiment

Figure 4:
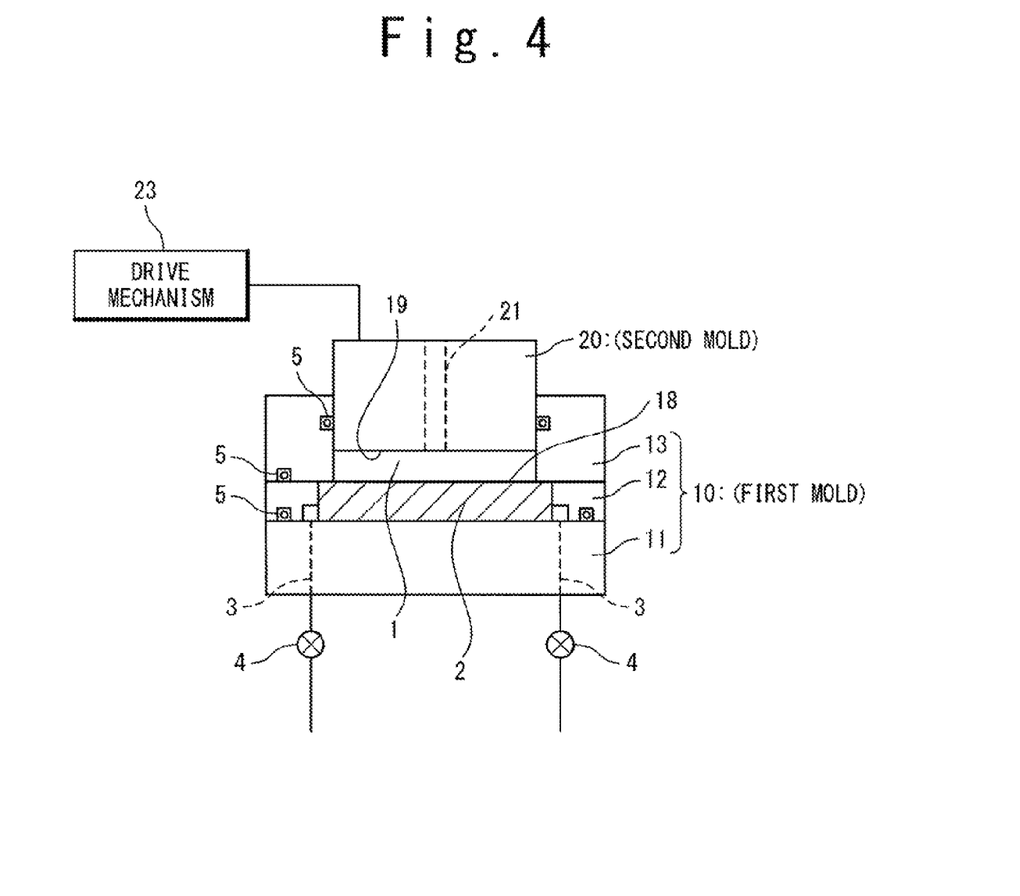
FIG. 4 is a diagram schematically showing a manufacturing apparatus of a fiber reinforced composite material according to a first embodiment.

A first embodiment of the present invention will be described with reference to the attached drawings. FIG. 4 is a diagram schematically showing a manufacturing apparatus of a fiber reinforced composite material according to the present embodiment. The manufacturing apparatus is an apparatus for impregnating a fiber-based material 2 with resin and curing the impregnated resin. The fiber reinforced composite material is obtained by curing the impregnated resin.

A glass fiber-based material and a carbon fiber-based material are exemplified as the fiber-based material 2 used in the present embodiment.

As shown in FIG. 4, the fiber reinforced composite material manufacturing apparatus includes a first mold 10, a second mold 20, a drive mechanism 23, a resin supply line 21 and resin ejection lines 3.

The first mold 10 and the second mold 20 are made of metals such as iron, aluminum, and invar.

The first mold 10 includes a first member 11, a second member 12 and a third member 13.

The first member 11 has a surface on which the fiber-based material 2 to be molded is placed.

The second member 12 is arranged to contact a side surface of the fiber-based material 2. The second member 12 is arranged to surround the fiber-based material 2. Movement of the fiber-based material 2 in an extending direction of the fiber-based material is restricted by the second member 12.

The third member 13 is placed on the second member 12. A part of the third member 13 extends onto the fiber-based material 2. Thus, the fiber-based material 2 is sandwiched and fixed by the first mold 10 at the end portions. The third member 13 is formed to have a frame shape corresponding to a shape of an outer peripheral portion of the fiber-based material 2. Therefore, an upper surface portion the fiber-based material 2 other than the outer peripheral portion is not covered by the third member 13 and is free. The free upper surface portion of the fiber-based material 2 is defined as a first surface 18 hereinafter.

The second mold 20 has a second surface 19. The second mold 20 is arranged in such a manner that the second surface 19 faces to the first surface 18 of the fiber-based material 2. The second mold 20 is relatively movable with respect to the first mold 10. Specifically, the second mold 20 is constructed in such a manner that a distance between the second surface 19 and the first surface 18 is variable. When the second surface 19 is distanced away from the first surface 18, a space 1 is formed between the first mold 10 and the second mold 20. The side portion of the second mold slidably contacts the third member 13 so that the space 1 becomes a sealed space.

A seal member 5 is attached to a portion where the first mold 10 and the second mold 20 come into contact with each other. The resin is filled into the space 1 at the time of molding. Leakage of the resin is prevented by the seal member 5 at the time of filling the resin into the space 1.

The drive mechanism 23 is a unit for moving the second mold 20. The drive mechanism 23 is an actuator.

The resin supply line 21 is a flow path for supplying the resin to the space 1. The resin supply line 21 is provided in the second mold 20 so that the space 1 is communicated to the outside. The resin supply line 21 can be connected to a resin supply unit (not shown). Further, the resin supply line 21 is constructed to be connectable with a resin actuator (not shown in FIG. 4).

Each of the resin ejection lines 3 is a flow path for ejecting the supplied resin. The resin ejection lines 3 are provided in the first mold 10. The resin ejection lines 3 are provided in such a manner that the side surface of the fiber-based material 2 is communicated to an external unit or environment. A tube with a valve 4 is connected to each of the resin ejection line 3. By opening and closing the valve 4, a flow of the resin through the resin ejection line 3 can be controlled. Further, each of the resin ejection lines 3 is connected to a pressure reducing unit (not shown) through the tube.

Figure 5:
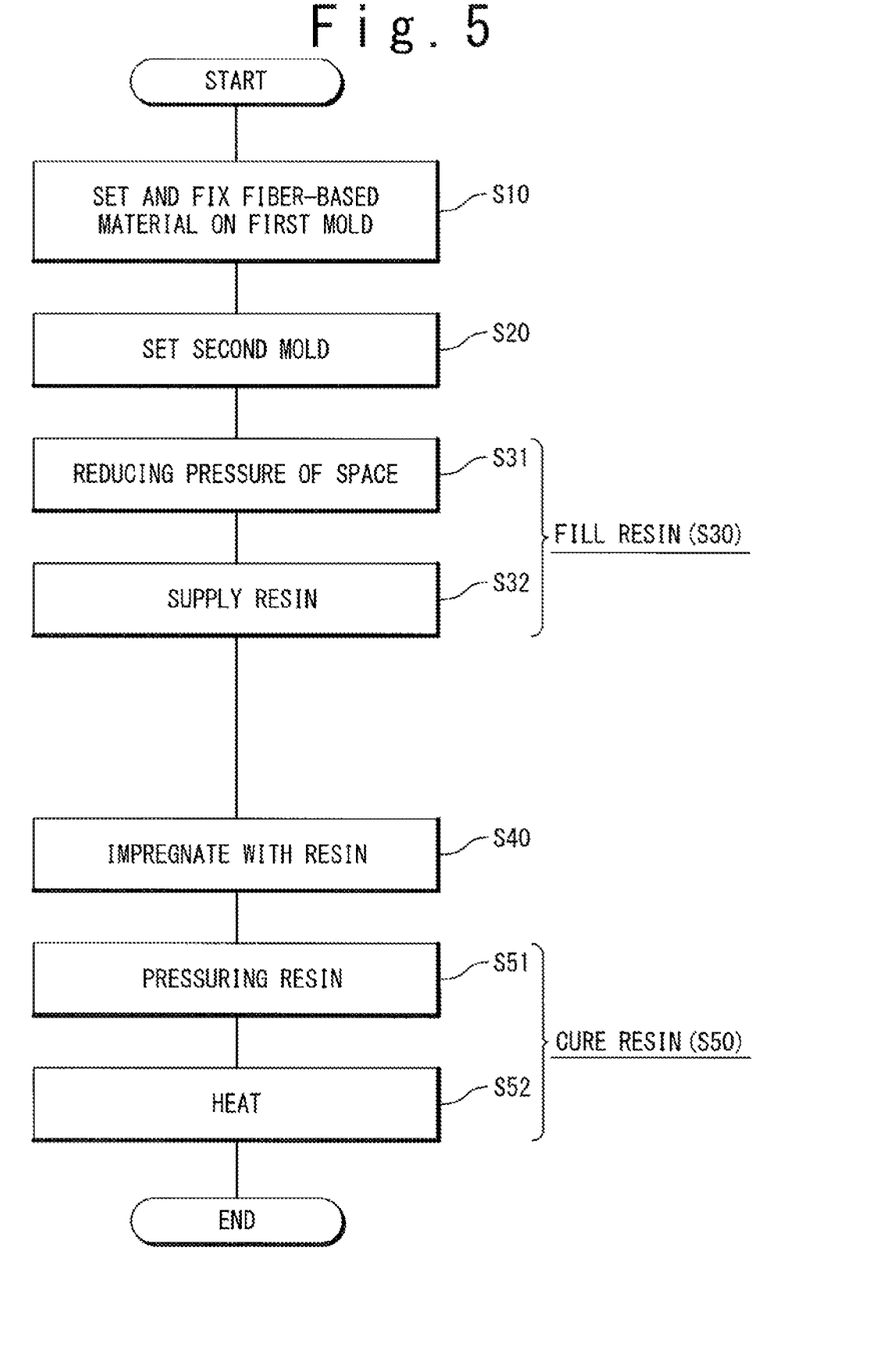
FIG. 5 is a flow chart showing a manufacturing method of the fiber reinforced composite material according to the first embodiment.

Subsequently, a fiber reinforced composite material manufacturing method according to the present embodiment will be described. FIG. 5 is a flow chart showing the fiber reinforced composite material manufacturing method.

Step S10: Setting of Fiber-Based Material

Initially, the fiber-based material 2 is placed on the first member 11. Then, the second member 12 and the third member 13 are set for the peripheral portions of the fiber-based material 2 to be pressed at the both surfaces thereof.

Step S20: Setting of Second Mold

Further, as shown in FIG. 4, the second mold 20 is attached. At this time, the second mold 20 is attached in such a manner that the second surface 19 faces to the first surface 18 through the space 1.

Step S30: Filling of Resin

Figure 6:
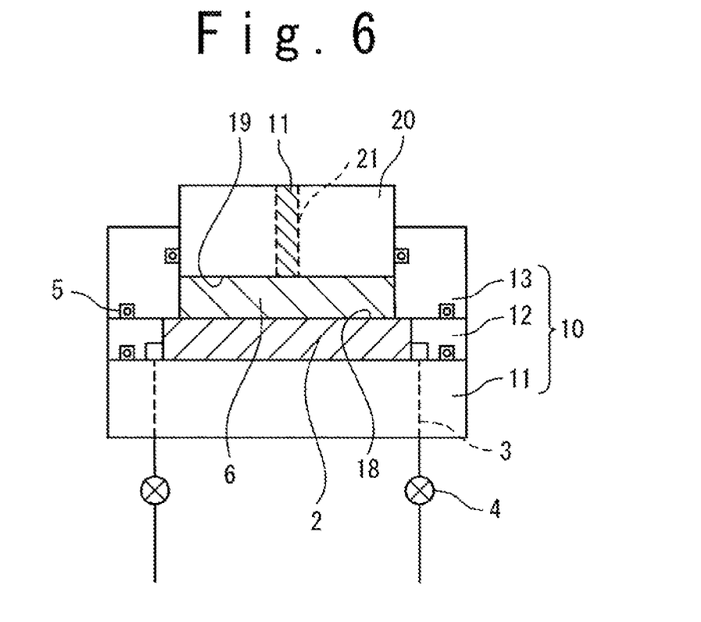
FIG. 6 is a process diagram showing the manufacturing method of the fiber reinforced composite material according to the first embodiment.

Subsequently, each of the resin ejection lines 3 is connected to the pressure reducing unit (not shown) and the pressure inside the space 1 is reduced by the pressure reducing unit (Step S31). Next, the resin supply unit (not shown) is attached to the resin supply line 21 and the resin 6 is supplied into the space 1 through the resin supply line 21 as shown in FIG. 6 (Step S32). At this time, the resin 6 may be supplied in the state that the resin 6 is warmed, in order to increase flowability. The supplied resin 6 fills the space 1. Further, an excessive amount of resin is infiltrated in the fiber-based material 2 and is ejected through the resin ejection lines 3 from the side portions of the fiber-based material 2. It should be noted that when air remains inside the space 1 and the fiber-based material 2, the resin mixed with the air is ejected through the resin ejection lines 3. Therefore, by observing whether or not air bubbles are contained in the resin flowing through the resin ejection lines 3, it can be checked whether or not the filling of the resin 6 is completed.

Step S40: Impregnation of Resin

Figure 7:
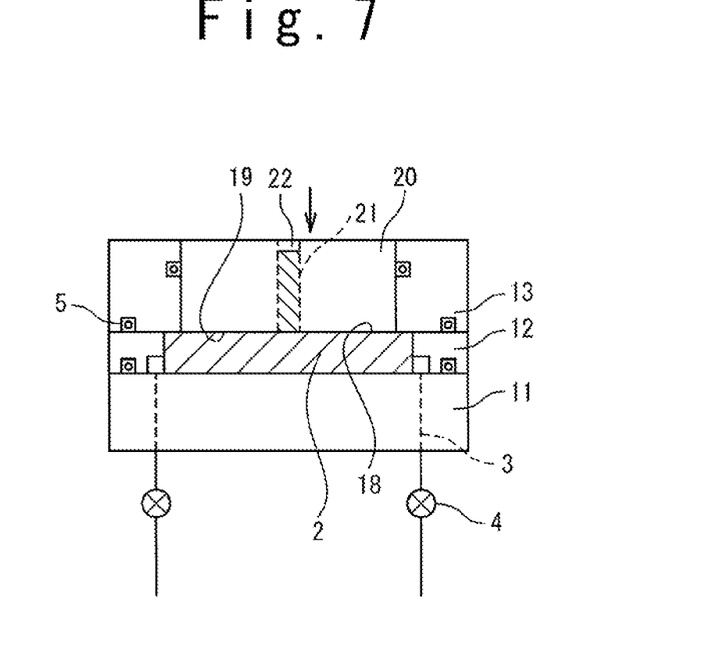
FIG. 7 is a process diagram showing a manufacturing method of the fiber reinforced composite material according to the first embodiment.

Subsequently, as shown in FIG. 7, a closing member 22 is attached to the resin supply line 21 to close the resin supply line 21. Alternatively, a valve of the resin supply line 21 may be closed. Then, the second mold 20 is depressed or pushed to the first mold 10 by the drive mechanism 23. The second mold 20 is depressed to a position where the second surface 19 is contact with the first surface 18. That is, the second mold 20 is pushed down until the space 1 disappears. Thus, the fiber-based material 2 is impregnated with the resin 6 filled in the space 1.

In this step, the resin 6 filled in the space 1 is pushed with a plane (i.e., the second surface 19) and thereby the fiber-based material 2 is impregnated with the resin 6. Also, a portion where the resin 6 infiltrates into the fiber-based material 2 is a plane (i.e., the first surface 18). Therefore, the resin 6 quickly infiltrates into the entire fiber-based material 2.

Step S50: Curing of Resin

Figure 8:
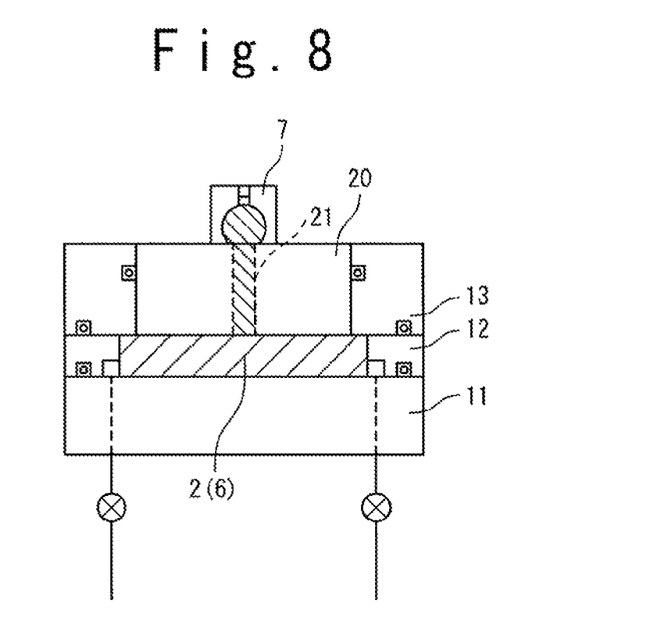
FIG. 8 is a process diagram showing the manufacturing method of the fiber reinforced composite material according to the first embodiment.

Subsequently, each of the valves 4 is closed and the closing member 22 is detached. Then, as shown in FIG. 8, a resin accumulator 7 is attached to the resin supply line 21. The resin 6 impregnated into the fiber-based material 2 is pressurized by the resin accumulator 7 (Step S51). Further, the first mold 10 and the second mold 20 are carried into a heating unit (not shown) such as an oven to be heated (Step S52). Thus, the resin 6 is cured and the fiber reinforced composite material is obtained. The obtained fiber reinforced composite material is formed to have a shape corresponding to a space finally formed between the first mold 10 and the second mold 20.

It should be noted that it is not always necessary to use the resin accumulator 7 for the purpose of pressurizing the resin 6, and another pressurizing unit may be used. However, it is preferable to use the resin accumulator 7 from a viewpoint that the resin accumulator 7 can pressurize the resin 6 to a desired pressure even when a pressure supplied from a pressure source is low.

Moreover, the resin 6 is merely required to be heated, and it is not always necessary to prepare the heating unit such as the oven. For example, a flow path may be provided for warmed oil to flow through the first mold 10 or the second mold 20. In this case, by the warmed oil, the first mold 10 or the second mold 20 is heated and the resin 6 is heated.

As described above, according to the present embodiment, since the resin 6 is pushed with the plane and infiltrates into the fiber-based material 2 from the surface, the resin 6 can speedily infiltrate.

Further, when the resin 6 is supplied while being warmed in order to increase the flowability, if it takes time for the resin 6 to infiltrate into the fiber-based material 2, there may be a case that the resin is cured. According to the present embodiment, since the resin 6 can be infiltrated in a short time, the resin 6 can be prevented from being cured before the resin 6 infiltrates. Thus, the resin 6 can be surely infiltrated into the entire fiber-based material 2.

In addition, in the present embodiment, the shape of the obtained fiber reinforced composite material is defined by the first mold 10 and the second mold 20. The thickness of the fiber reinforced composite material is defined by a final distance between the first mold 10 and the second mold 20. Since the dimension of the fiber reinforced composite material is defined by the shapes of the first and second molds 10 and 20 and the distance between the first and second molds 10 and 20, the fiber reinforced composite material can be molded at high dimensional accuracy.

Moreover, the present embodiment is particularly effective when the fiber-based material having a side longer than 300 mm is used. Such a fiber-based material has a large flow resistance against the resin and it is usually difficult to extend the resin over the entire surface of the fiber-based material. However, according to the present embodiment, even in the fiber-based material having the side longer than 300 mm, the resin can be extended over the entire surface of the fiber-based material.

Also, the present embodiment is particularly effective when the fiber-based material having the side of 3 mm in thick or more is used. In such a fiber-based material, it is usually hard for the resin to be infiltrated in a thickness direction. However, according to the present embodiment, even in the fiber-based material having the side of 3 mm in thick or more, the resin can be uniformly infiltrated in the thickness direction.

Also, the present embodiment is particularly effective when the fiber-based material having the fiber volume content of 50 to 60% is used. When the fiber volume content exceeds 50%, it is usually extremely difficult to impregnate with the resin. However, according to the present embodiment, even in the fiber-based material having the fiber volume content exceeding 50%, the resin can easily impregnate. In meanwhile, if the fiber volume content exceeds 60%, the resin tends to be hard to infiltrate.

Also, the present embodiment is particularly effective when the resin having the resin viscosity of 100 to 500 mPa·s (100 to 500 cp) is used. If the resin viscosity exceeds 500 cp, the resin tends to be hard to impregnate.

Subsequently, a modified example of the first embodiment will be described.

Figure 9:
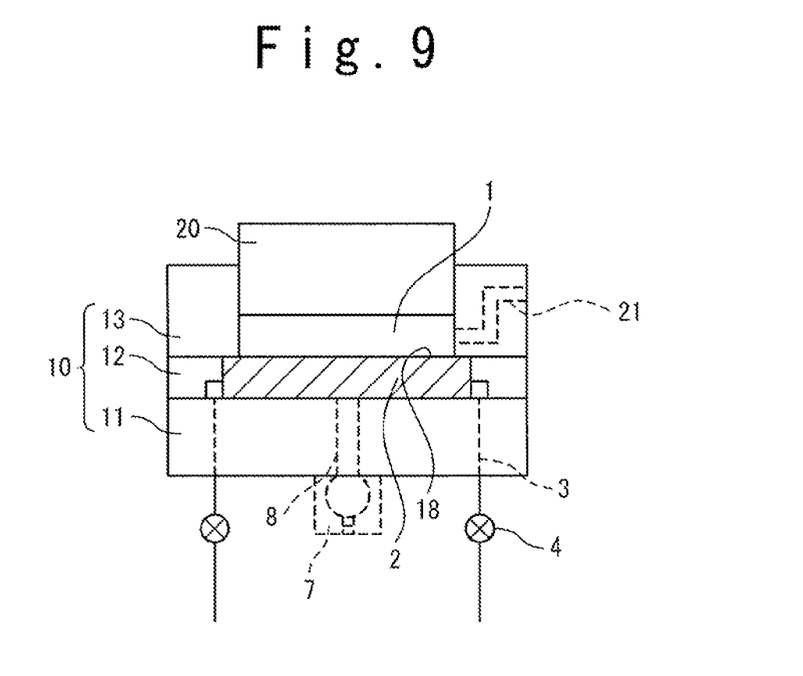
FIG. 9 is a diagram schematically showing the manufacturing apparatus of the fiber reinforced composite material according to a modified example of the first embodiment.

FIG. 9 is a diagram schematically showing a manufacturing apparatus of the fiber reinforced composite material according to the present modified example. In the manufacturing apparatus of the fiber reinforced composite material according to this modified example, the resin supply line 21 is not provided in the second mold 20 but provided in the first mold 10. Further, a pressurizing line 8 is provided other than the resin supply line 21. In the present modified example, since the resin supply line 21 is similar to that of the first embodiment, the detailed explanation thereof is omitted.

The pressurizing line 8 is provided in the first member 11. The pressurizing line 8 is constructed to be connectable to the resin accumulator 7. In the present modified example, the pressurizing line 8 is connected to the resin accumulator 7 at the time of pressurizing the resin 6 in Step S51.

As shown in the present modified example, it is possible to separately provide a line at the time of supplying the resin and a line at the time of pressurizing. From the viewpoint of simplification of the configuration, however, it is preferable that the resin supply line 21 and the pressurizing line 8 are used in common.

Further, as shown in the present modified example, it is not always necessary to provide the resin supply line 21 in the second mold 20. The second mold 20 is a part that is moved by the drive mechanism 23. When the resin supply line 21 is provided in the second mold 20, the resin supply unit is attached to the second mold 20. If such an external unit is attached to the movable second mold, there may be a fear that it becomes difficult to move the second mold 20. By attaching the resin supply line 21 to the first mold 10, such a fear can be dissolved.

Subsequently, another modified example of the present embodiment will be described.

Figure 10:
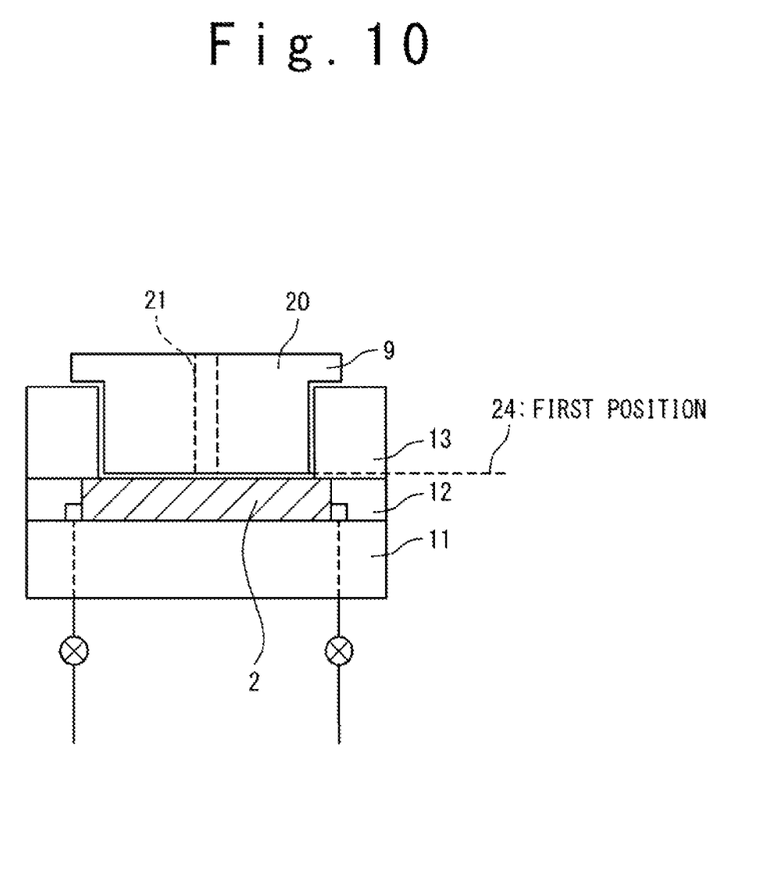
FIG. 10 is a diagram schematically showing the manufacturing apparatus of the fiber reinforced composite material according to another modified example of the first embodiment.

FIG. 10 is a diagram schematically showing a manufacturing apparatus of a fiber reinforced composite material according to the present modified example. In the manufacturing apparatus of the fiber reinforced composite material according to this modified example, a stopper mechanism 9 is provided for the second mold 20. The stopper mechanism 9 extends from a part of the second mold 20 in a direction in parallel to the fiber-based material 2. The stopper mechanism 9 comes in contact with the first member 13 so that the second mold 20 is restricted from moving toward the first mold 10 beyond a predetermined position (i.e., a first position 24).

By providing the stopper mechanism 9, a dimension of a space finally formed between the first mold 10 and the second mold 20 can be accurately controlled. Consequently, the fiber reinforced composite material can be formed at high dimensional accuracy.

Second Embodiment

Subsequently, a second embodiment of the present invention will be described.

FIGS. 11 to 15 are process diagrams showing a manufacturing method of the fiber reinforced composite material according to the present embodiment. It is noted that the explanation of the same components as in the first embodiment is appropriately omitted.

Figure 11:
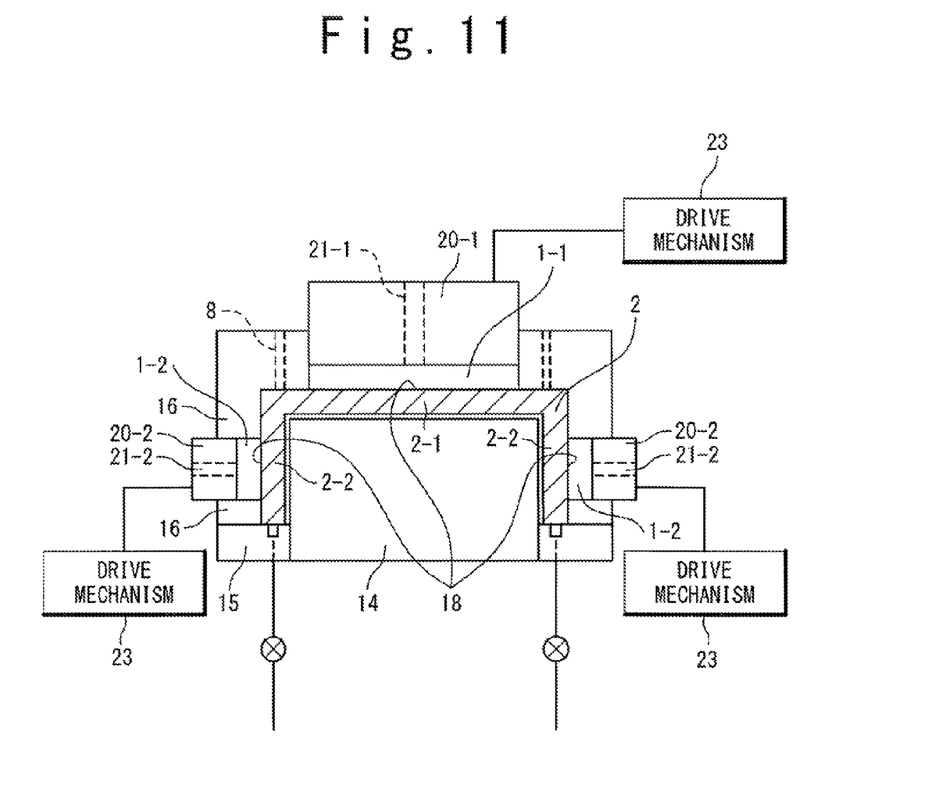
FIG. 11 is a process diagram showing the manufacturing method of the fiber reinforced composite material according to a second embodiment.

In the present embodiment, the fiber-based material 2 is bent and folded, as shown in FIG. 11. A central portion of the fiber-based material 2 is designated as a central region 2-1 and both end portions of the fiber-based material are designated as end regions 2-2. It is assumed that a first surface 18 is provided on each of the central region 2-1 and the end regions 2-2.

The first mold 10 includes a fourth member 14, a fifth member 15 and a sixth member 16.

The fourth member 14 is a member for mounting the folded fiber-based material 2 thereon and is formed to have a shape corresponding to the fiber-based material 2.

The fifth member 15 is arranged to support the end surface of the fiber-based material 2 by the upper surface.

The sixth member 16 is arranged to sandwich the end region 2-2 between the sixth member 16 and the fourth member 14. An opening portion is formed in the sixth member 16 such that the second mold 20 can be arranged. Moreover, pressurizing lines 8 are provided in the sixth member 16.

The second mold 20 is separated into a plurality of sections corresponding to the central region 2-1 and the end regions 2-2, respectively. Specifically, a second mold section 20-1 is provided for the central region 2-1 and second mold sections 20-2 are provided for the end regions 2-2. The second mold sections 20-1 and 20-2 are slid along wall surfaces of the opening portions formed in the sixth member 16, respectively. Moreover, a drive mechanism 23 is attached to each of the second mold sections 20-1 and 20-2.

Each of the second mold sections (20-1, 20-2) is provided with resin supply lines (21-1, 21-2).

Subsequently, a manufacturing method of a fiber reinforced composite material according to the present invention will be described.

Initially, as shown in FIG. 11, the folded fiber-based material 2 is fixed to the first mold 10 and the second mold sections 20-1 and 20-2 are set. At this time, the second mold sections 20-1 and 20-2 are set in such a manner that spaces 1-1 and 1-2 are respectively formed, similarly to the embodiments already discussed.

Figure 12:
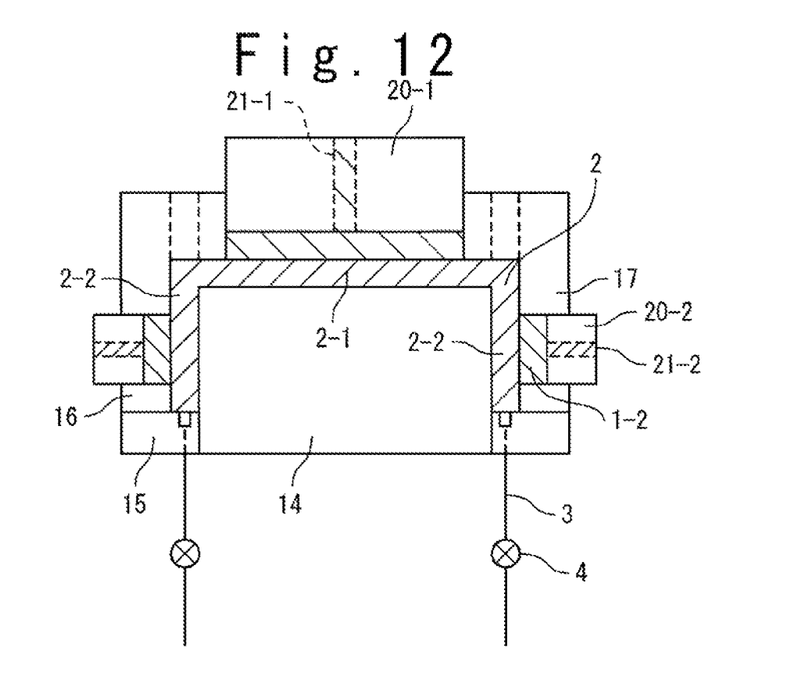
FIG. 12 is a process diagram showing the manufacturing method of the fiber reinforced composite material according to the second embodiment.

Subsequently, as shown in FIG. 12, resin 6 is supplied to the spaces 1 (1-1, 1-2) through the resin supply lines 21 (21-1, 21-2).

Figure 13:
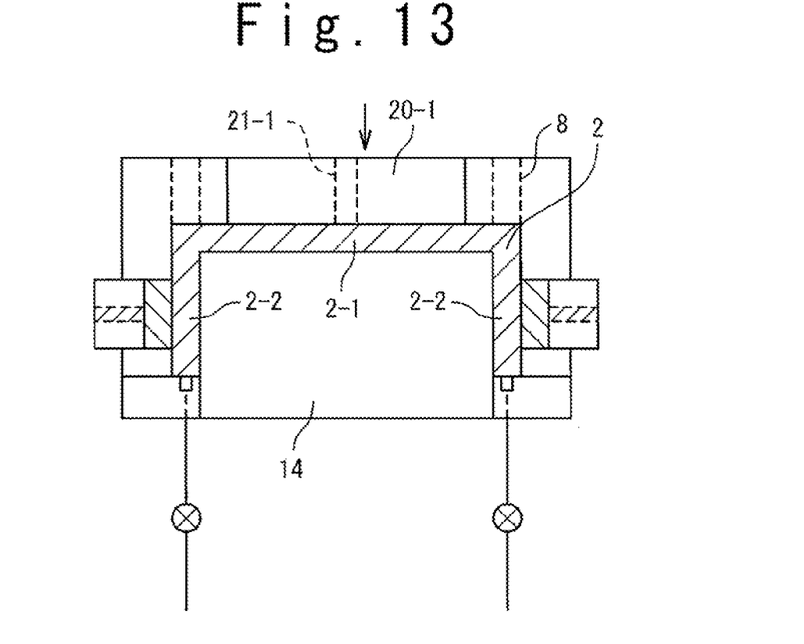
FIG. 13 is a process diagram showing the manufacturing method of the fiber reinforced composite material according to the second embodiment.
Figure 14:
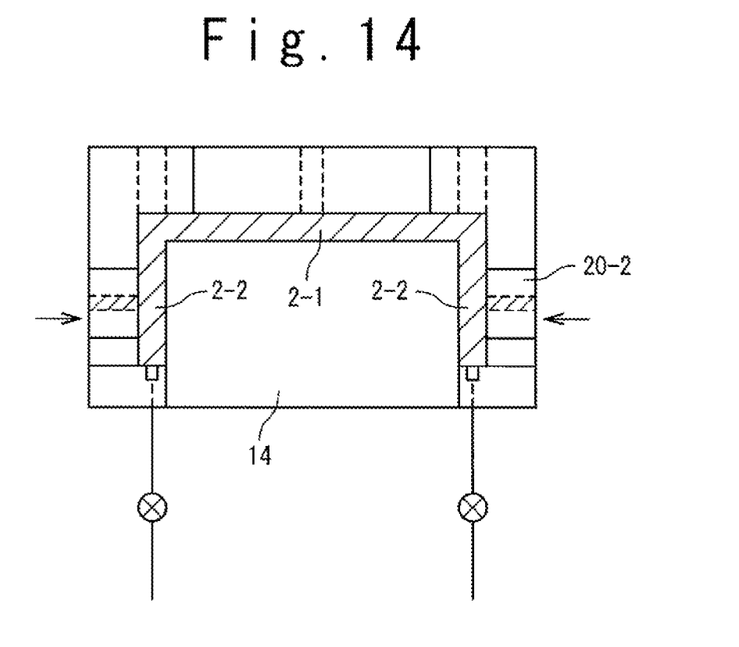
FIG. 14 is a process diagram showing the manufacturing method of the fiber reinforced composite material according to the second embodiment.

After the resin is filled in the spaces 1 (1-1, 1-2), the second mold sections (20-1, 20-2) are pressed toward the fiber-based material 2 such that the fiber-based material 2 is impregnated with the resin 6. At this time, the second mold section 20-1 corresponding to the central region 2-1 is first pressed toward the fiber-based material 2, as shown in FIG. 13. Thus, the central region 2-1 is impregnated with the resin 6. Thereafter, the second mold sections 20-2 corresponding to the end regions 2-2 are pressed toward the fiber-based material 2 as shown in FIG. 14. Thus, the end regions 2-2 are impregnated with the resin 6.

Figure 15:
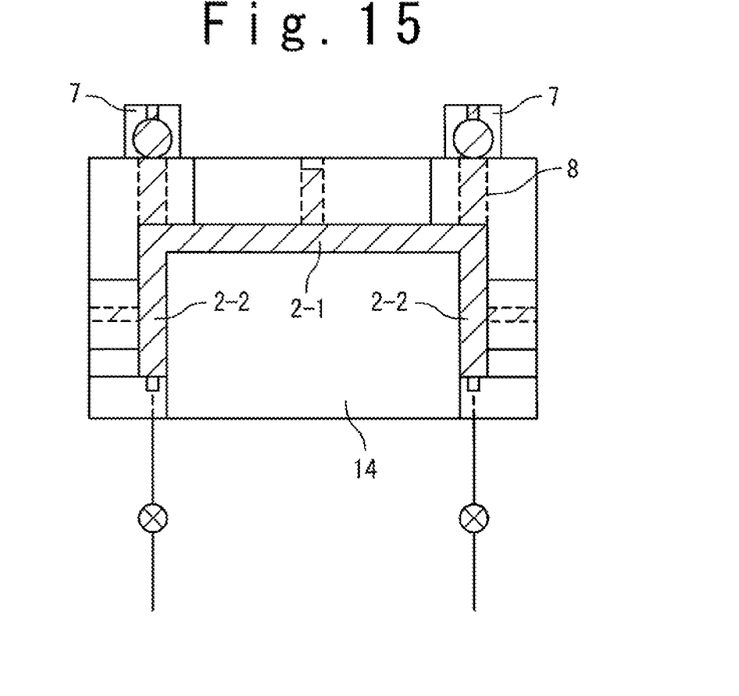
FIG. 15 is a process diagram showing the manufacturing method of the fiber reinforced composite material according to the second embodiment.

After that, similarly to the first embodiment, the impregnated resin 6 is pressurized and cured by the resin accumulators 7 so that the fiber reinforced composite material is obtained (shown in FIG. 15).

If the resin 6 is infiltrated into the central region 2-1 and the end regions 2-2 at the same time, there are possibly caused portions which are not impregnated with the resin 6, between the central region and the end regions 2-2. Particularly, when the fiber-based material 2 is folded, it is difficult to impregnate the folded portion with the resin 6. Whereas, in the present embodiment, the resin 6 is first infiltrated into the central region 2-1 of the fiber-based material 2 and thereafter infiltrated into the end regions 2-2 thereof. Thus, it is suppressed to form regions which are not impregnated with the resin 6, between the central region 2-1 and the end regions 2-2, and therefore the entire portion of the fiber-based material 2 can be easily impregnated with the resin 6.

As described above, the first and second embodiments of the present invention have been described. It should be noted that the embodiments and modified examples as discussed above can be used in combination within a range having no contradiction.

It should be noted that the present patent application claims a priority based on Japanese Patent Application No. 2008-296127, and the disclosure thereof is incorporated herein by reference.

The invention claimed is:

1. A manufacturing method of a fiber reinforced composite material comprising:
    fixing a fiber-based material on a first mold such that an opening is defined at a first surface of the fiber-based material and such that a peripheral portion of the fiber-based material is sandwiched by the first mold to restrict movement of the fiber-based material in an extending direction thereof;
    providing a sealed space by setting a second mold having a second surface such that the second surface faces the first surface of the fiber-based material;
    after said providing the sealed space, filling resin into the sealed space; and
    relatively moving said second mold toward said first mold to bring the second surface closer to the first surface, such that the fiber-based material is impregnated with the resin through the first surface of the fiber-based material,
    wherein the first mold comprises
        a first member on which the fiber-based material is placed,
        a second member which surrounds and directly contacts a side surface of the fiber-based material, and
        a third member having a frame shape corresponding to a shape of the peripheral portion of the fiber-based material, a part of the third member being in direct contact with the peripheral portion of the fiber-based material;
    wherein said providing a sealed space by setting a second mold comprises providing the sealed space defined by the first surface of the fiber-based material, the third member, and the second surface of the second mold.

2. The manufacturing method according to claim 1, wherein said filling comprises:
    reducing a pressure of the space; and
    supplying the resin into the space after said reducing.

3. The manufacturing method according to claim 1, further comprising:
    curing the impregnated resin after the impregnation with the resin.

4. The manufacturing method according to claim 3, wherein said curing comprises:
    curing the impregnated resin by pressurizing and heating.

5. The manufacturing method according to claim 4, wherein said curing comprises:
    pressurizing the impregnated resin with a resin accumulator.

6. The manufacturing method according to claim 3, wherein said curing comprises:
    curing the impregnated resin by heating the impregnated resin.

7. The manufacturing method according to claim 1, wherein said fiber-based material comprises a central region and end regions on end sides of the central region,
   wherein the first surface is provided for each of the central region and the end regions,
   wherein second mold sections of said second mold are provided on a plurality of positions to oppose to the central region and the end regions, respectively, and
   wherein said relatively moving comprises:
   depressing a central one of said second mold sections opposing to the central region; and
   depressing one of said second mold sections opposing to each of the end regions after said depressing the central one of said second mold sections.

8. The manufacturing method according to claim 7, wherein said fiber-based material is folded between the central region and each of the end regions.

9. The manufacturing method according to claim 1, further comprising decompressing the sealed space before said filling resin into the sealed space,
   wherein said filling resin into the sealed space includes supplying the resin to the sealed space, via a resin supply line, after said decompressing,
   wherein said resin supply line is closed during said relatively moving said second mold toward said first mold to pressurize the sealed space,
   wherein said fixing the fiber-based material on the first mold includes arranging the third member such that the peripheral portion of the fiber-based material is sandwiched by the first member and the third member,
   wherein the first surface is an open area in an upper surface of the fiber-based material.

10. The manufacturing method according to claim 9, wherein said filling comprises:
    reducing a pressure of the space; and
    supplying the resin into the space after said reducing.

11. The manufacturing method according to claim 9, further comprising:
    curing the impregnated resin after the impregnation with the resin.

12. The manufacturing method according to claim 11, wherein said curing comprises:
    curing the impregnated resin by pressurizing and heating.

13. The manufacturing method according to claim 12, wherein said curing comprises:
    pressurizing the impregnated resin with a resin accumulator.

14. The manufacturing method according to claim 11, wherein said curing comprises:
    curing the impregnated resin by heating the impregnated resin.

15. The manufacturing method according to claim 1, wherein
    The first member, the second member, and the third member are all separate members; and
    The second member is abutted against the first member, and the third member is abutted against the second member.

16. The manufacturing method according to claim 15, wherein a first seal is disposed between the first and second members, and a second seal is disposed between the second and third members.

17. The manufacturing method according to claim 15, wherein
    The second mold is separate from the first, second and third members of the first mold; and
    The second mold is disposed within the frame shape of the third member.

18. The manufacturing method according to claim 17, wherein a seal is disposed between the second mold and the third member of the first mold.

* * * * *